US007137761B2

(12) United States Patent
Hara et al.

(10) Patent No.: US 7,137,761 B2
(45) Date of Patent: Nov. 21, 2006

(54) RIGHT ANGLE DRILL WITH AN IMPROVED STRUCTURE FOR ACCOMMODATING A LIGHT ASSEMBLY

(75) Inventors: Akihito Hara, Ama-gun (JP); Shinya Shimizu, Okazaki (JP)

(73) Assignee: Makita Corporation, Anjo (JP)

(*) Notice: Subject to any disclaimer, the term of this patent is extended or adjusted under 35 U.S.C. 154(b) by 505 days.

(21) Appl. No.: 10/358,657

(22) Filed: Feb. 5, 2003

(65) Prior Publication Data

US 2003/0147709 A1 Aug. 7, 2003

(30) Foreign Application Priority Data

Feb. 5, 2002 (JP) ............................ 2002-028679

(51) Int. Cl.
*B23B 45/00* (2006.01)

(52) U.S. Cl. ........................................ 408/16; 408/124

(58) Field of Classification Search .................. 408/16, 408/124; 362/192, 253, 800; 173/170, 216, 173/362, 217; 310/47, 89; 200/334, 335, 200/344, 522

See application file for complete search history.

(56) References Cited

U.S. PATENT DOCUMENTS 2,517,882 A * 8/1950 Johnson ....................... 173/46
2,588,288 A * 3/1952 Pohanka ..................... 439/575
2,822,615 A * 2/1958 Durst et al. ................... 33/286
4,230,453 A * 10/1980 Reimers ...................... 433/29
4,474,077 A 10/1984 Debelius ...................... 74/606
4,642,738 A * 2/1987 Meller ........................ 362/119
5,169,225 A * 12/1992 Palm .......................... 362/118
5,445,479 A 8/1995 Hillinger ..................... 408/16
5,797,670 A * 8/1998 Snoke et al. ................ 362/119
6,102,632 A * 8/2000 Potter et al. ................ 408/124
6,293,172 B1 * 9/2001 Smith ........................ 81/57.13
6,318,874 B1 * 11/2001 Matsunaga .................. 362/119
6,494,590 B1 * 12/2002 Paganini et al. ............ 362/119

* cited by examiner

*Primary Examiner*—Monica Carter
*Assistant Examiner*—Sara Addisu
(74) *Attorney, Agent, or Firm*—Lahive & Cockfield, LLP; Anthony A. Laurentano, Esq.

(57) ABSTRACT

A right angle drill (1) includes a motor housing (6) which defines therein a hole (18) for accommodating a motor field system (3), a cut-out (15) formed in the underside of the motor housing (6) from the front end toward the rear of the tool (1), and a light unit (16) slidably fitted in the cut-out (15). The light unit (16) is a plate member having an arcuate cross section so as to define an inwardly curved rear (i.e., inner) surface (16*a*) along its entire length. The unit's inner surface (16*a*) conforms to the inner surface of the accommodating hole (18) of the motor housing (6). The light unit (16) additionally includes a protrusion (17) at the front outer surface thereof. Furthermore, the protrusion (17) contains a pair of LEDs (21) for illuminating objects below an output spindle (12) to which a bit can be attached.

20 Claims, 4 Drawing Sheets

RIGHT ANGLE DRILL WITH AN IMPROVED STRUCTURE FOR ACCOMMODATING A LIGHT ASSEMBLY

RELATED APPLICATION(S)

This application claims priority on Japanese Patent Application No. 2002-28679 filed on Feb. 5, 2002.

BACKGROUND OF THE INVENTION

1. Field of the Invention

The present invention generally relates to electric power tools. More particularly, the present invention relates to an angle drill which includes a cylindrical motor housing and a top housing which is coupled to an end of the motor housing and from which a spindle protrudes at a right angle with respect to the motor housing.

2. Description of the Related Art

Certain known angle drills include a cylindrical motor housing which defines therein a hole to accommodate a motor and a top housing coupled to the forward end of the motor housing. The angle drill further includes an output spindle extends inside and out of the top housing at a right angle with respect to the motor housing. Additionally included in a certain type of angle drill is one or more illuminants (such as light emitting diodes, or LEDs) for providing light in the location below the output spindle in order to facilitate work in dark or dimly lit environments. Typically, such an illuminant(s) is embedded in the space within the motor accommodating hole of the motor housing except for the top portion of the illuminant, from which light is emitted.

While achieving its intended objective, the forgoing conventional arrangement suffers from a number of deficiencies that reduce the utility of the device. For example, as the illuminant or light unit protrudes into the motor accommodating hole of the motor housing, the illuminant may restrict the installation position of the motor's field system within the motor accommodating hole. The illuminant may additionally hinder the removal of the field system from the motor housing during repair or servicing.

Moreover, the motor housing must be reshaped depending on the presence or absence of the illuminant in the tool, thus increasing the manufacturing and other related costs of the drill.

SUMMARY OF THE INVENTION

In view of the above-identified problems, an important object of the present invention is to provide an angle drill which incorporates an illuminant that does not adversely affect the locations, installation, or removal of the motor and related parts.

The above object and other related objects are realized by the invention, which provides an angle drill including: a motor; a generally cylindrical motor housing which has a center axis and defines therein a hole for accommodating the motor; a top housing coupled to one end of the motor housing; a spindle extending, at a right angle with respect to the center axis of the motor housing, inside the top housing to one end which protrudes from the top housing; at least one illuminant disposed on a peripheral surface of the motor housing for illuminating objects generally located in the direction in which the spindle protrudes; and a first protrusion which is disposed on the peripheral surface of the motor housing and located on the same side of a plane containing the center axis as the protruding end of the spindle. The first protrusion is located outside the motor accommodating hole, and the at least one illuminant is disposed within the first protrusion. This arrangement ensures that the at least one illuminant does not limit the location of installation of the motor or obstruct the removal or installation of the motor for repair or replacement of the motor. The illuminant, being disposed within the protrusion, can effectively throw light on the location of work by ensuring the user's hand does not block the light path.

According to one aspect of the present invention, the angle drill further includes a switch for activating the motor by its depression toward the motor housing. The switch protrudes from the peripheral surface of the motor housing generally in parallel with the spindle, and the first protrusion extends axially farther outwards from the motor housing than does the switch. This arrangement prevents inadvertent activation of the switch when the user places the angle drill on a flat surface with the switch face-down.

According to one aspect of the present invention, the first protrusion is adapted so as to be removably attached to the motor housing. In this way, an angle drill without an illuminant can use the same motor housing by replacing the protrusion without any redesign of the motor housing required. This arrangement advantageously reduces the overall manufacturing costs of the power tool.

According to another aspect of the present invention, the motor housing includes therein a cut-out including on opposing side surfaces thereof a pair of ridges which are spaced apart from each other by a predetermined distance. Moreover, the drill further includes a light unit which in turn includes a plate portion having an inner surface with substantially the same curvature as an inner surface of the accommodating hole. The light unit further includes the first protrusion on an outer surface of the plate portion, and a pair of grooves in opposing side surfaces thereof. The grooves are spaced apart by approximately the predetermined distance and complementary in shape to the ridges on the cut-out of the motor housing so as to permit removable attachment of the light unit to the cut-out by slidable engagement of the ridges and the grooves. Thus, upon attachment of the light unit to the cut-out, the inner surfaces of the plate portion and the motor housing provide smooth transition therebetween within the motor accommodating hole, with the plate portion not protruding into the motor accommodating hole.

According to still another aspect of the present invention, the light unit further includes lead wires coupled to the at least one illuminant and a rearward-extending elongated protector portion along which the lead wires are routed so as to maintain separation between the lead wires and the motor.

According to yet another aspect of the present invention, the motor housing further includes a support protrusion which is provided at a rear end thereof and has substantially the same orientation as the first protrusion. Furthermore, the support protrusion protrudes substantially the same distance as the first protrusion with respect to the center axis when the switch is not depressed. The first protrusion and the support protrusion are configured such that the angle drill is capable of standing on a flat surface supported by the protrusions alone.

In one embodiment, the at least one illuminant includes at least one light emitting diode (LED).

According to one feature of the present invention, the electric power tool further includes a second unit having a shape identical to that of the light unit except for the omission of the at least one illuminant, the lead wires, and the protector portion. In this way, the second unit can replace the light unit in the angle drill, for example, if there is no need to provide illumination.

According to another feature of the present invention, the first protrusion, the support protrusion, and the switch are aligned on the peripheral surface of the motor housing in parallel with the center axis of the motor housing.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which.

DETAILED DESCRIPTION OF PREFERRED EMBODIMENTS

A preferred embodiment of the present invention will be described hereinafter with reference to the attached drawings.

Figure 1:
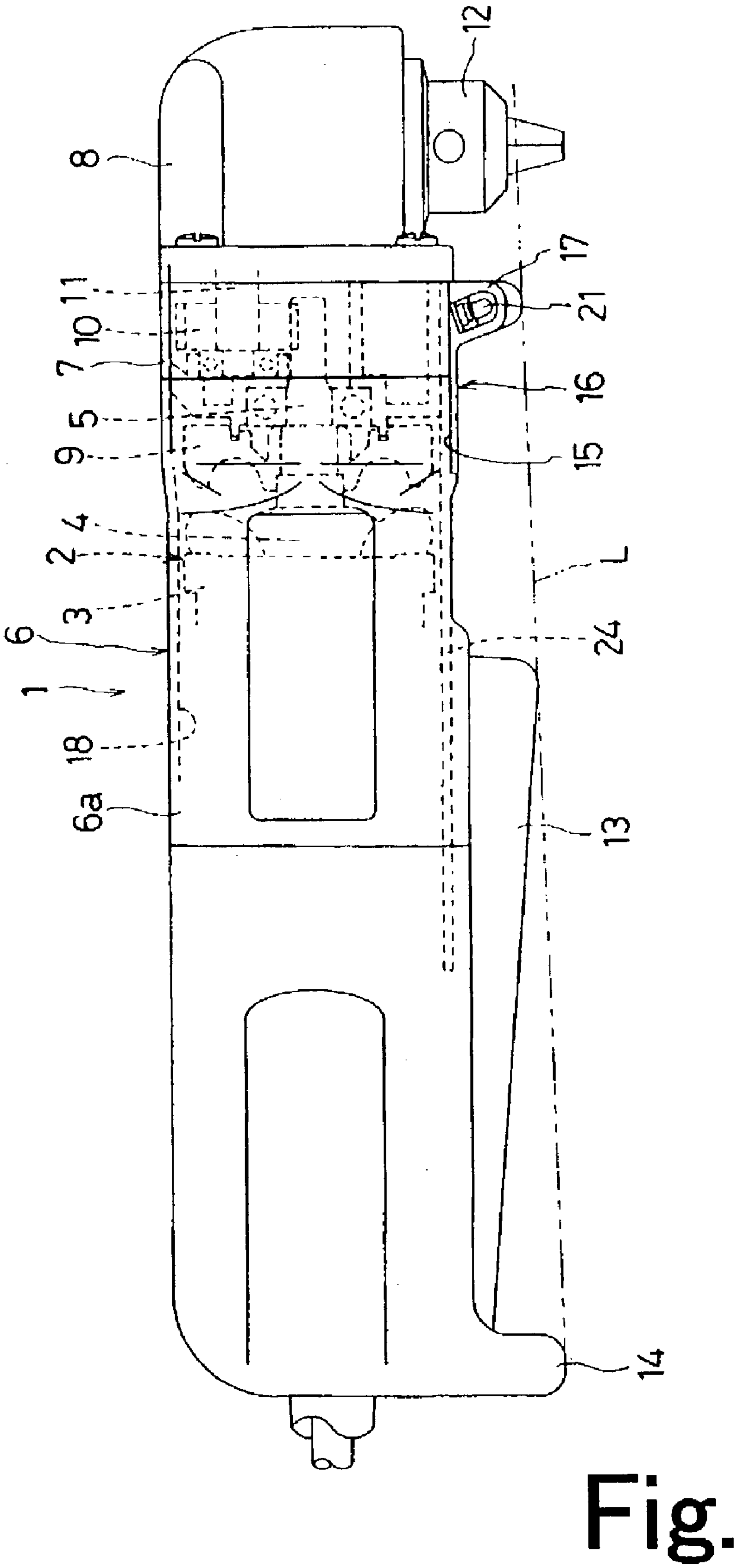
FIG. 1 is a side elevation of a right angle drill 1 in accordance with the present invention, with part of its internal mechanisms shown in broken lines.

FIG. 1 is a side elevation of a right angle drill 1 in accordance with the present invention, with part of its internal mechanisms shown in broken lines. The right angle drill 1 includes a motor housing 6 which in turn includes a cylindrical main housing body 6*a* and a gear housing cover 7 (described below) The main housing body 6*a* encases an electric motor 2 including a field system 3 and an armature 4 with an output shaft 5. The main housing body 6*a* defines therein a hole or cavity 18 for accommodating the motor 2. The above-mentioned gear housing cover 7 is assembled to the front end (the right side in the drawing) of the main housing body 6*a* so as to form the motor housing 6. The gear housing cover 7 rotatably supports the output shaft 5 of the armature 4 therein. A top housing or gear housing 8 is screwed to the front end of the main housing body 6*a*, integrating the gear housing cover 7, and the gear housing 8 with the main housing body 6*a*. The power tool 1 additionally includes a fan 9 secured to the output shaft 5 of the motor 2. Rotatably supported within the gear housing cover 7 is an intermediate shaft 11 which extends in parallel with the output shaft 5 of the motor 2 and which includes a gear 10 fixed on its rear end that is in mesh with the output shaft 5. The intermediate shaft 11 also meshes with an output spindle 12 disposed within the gear housing 8 via a bevel gear (not shown). The output spindle 12 is oriented perpendicularly with respect to the longitudinal axis of the output shaft 5 and the intermediate shaft 11, protruding from and below the gear housing 8. In addition, the output spindle 12 includes a chuck at its lower end for removably attaching various tool bits. The right angle drill 1 additionally includes a paddle or lever switch 13 disposed at the underside of the main housing body 6*a* for activating the motor 2. Provided at the lower rearmost end of the main housing body 6*a* is a support protrusion 14 which protrudes downward by substantially the same amount or distance as does the paddle switch 13 when it is not depressed, as indicated by the horizontal two-dot chain line L in FIG. 1.

Figure 2:
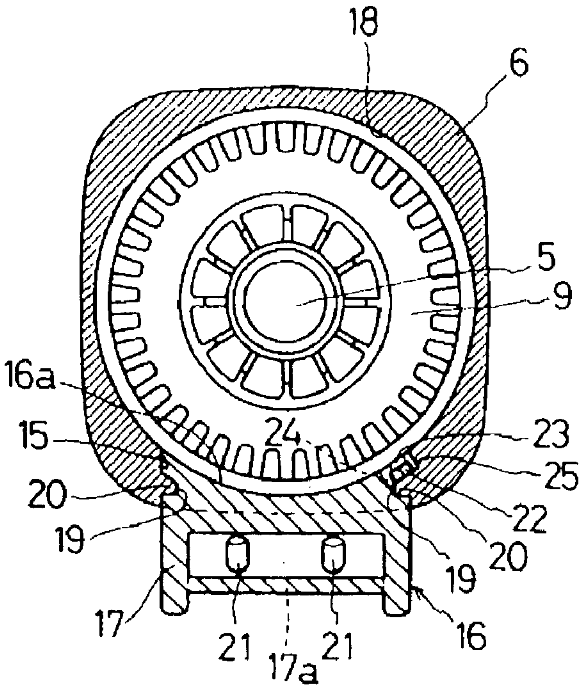
FIG. 2 is a cross sectional view of the right angle drill of FIG. 1 taken on a line across the motor housing (with the gear housing cover omitted from the view)
Figure 3:
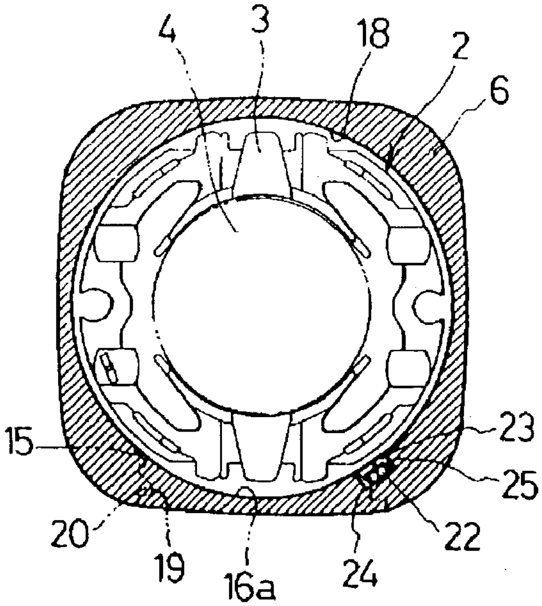
FIG. 3 is a cross sectional view of the right angle drill of FIG. 1 taken on a line across the motor.
Figure 4:
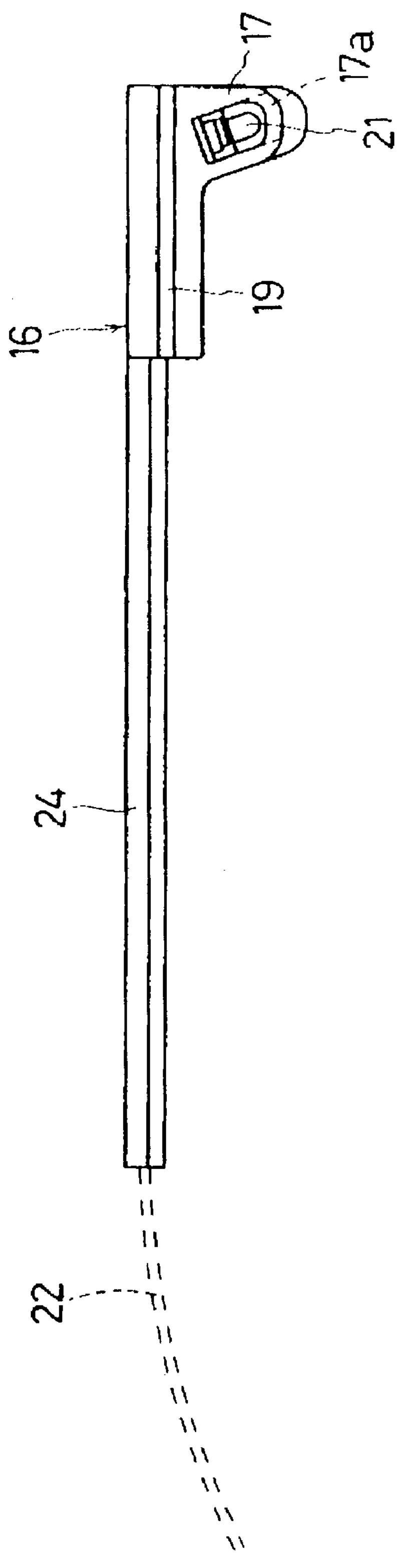
FIG. 4 is a side elevation of the light unit of the drill shown in FIG. 1.

Referring to FIGS. 1–3, a cut-out 15 is formed in the underside of the main housing body 6*a* from the front end toward the rear end thereof. A light unit 16 is fitted snugly in the cut-out 15 to provide light in dark work environments. The light unit 16 is a plate having an arcuate cross section so as to define an inwardly curved rear (i.e., inner) surface 16*a* along its entire length. As shown in FIG. 2, the unit's inner surface 16*a* conforms to the inner surface of the accommodating hole 18 of the main housing body 6*a*, providing smooth surface-to-surface transition. As also shown in FIG. 4, the light unit 16 includes a protrusion 17 at the outer front surface thereof. The light unit 16 additionally includes a pair of grooves 19 on both side surfaces thereof which extend rearwards from the front end of the unit 16 and are adapted to fit on complementary ridges 20 formed on both inner side surfaces of the cut-out 15. It is noted that the protrusion 17 of the light unit 16 also has substantially the same amount of downward protrusion as the paddle switch 13 in its undepressed position, in much the same manner as the support protrusion 14.

As shown in FIG. 2, the light unit 16 further includes a pair of illuminants or light emitting diodes (LEDs) 21 transversely aligned in the protrusion 17. Lead wires 22 are coupled to the LEDs 21 and passed along one side of the light unit 16 through a guide groove 23 that is axially recessed in the unit 16 along the left groove 19. The lead wires 22 are routed rearward from the LEDs 21 to the drive circuit (not shown) of the motor 2 (described in further detail below). Moreover, the protrusion 17 of the light unit 16 includes a transparent portion 17*a* (see FIG. 4) generally below and forward of LEDs 21 to permit transmission of the light emitted by the LEDs.

Furthermore, the light unit 16 further includes a protector portion 24 that extends rearward behind the LEDs 21. The aforementioned guide groove 23 is formed in one side of the protector portion 24 along the entire length thereof so as to separate the lead wires 22 from the field system 3 of the motor 2. Additionally, a protector groove 25 is formed continuously from the cut-out 15 in the accommodating hole 18 of the main housing body 6*a* so as to removably receive the protector portion 24 therein. The lead wires 22 is passed along the protector portion 24 and electrically connected, at a point beyond the rear end of the protector portion 24, to the motor's drive circuit via a connector (not shown). Accordingly, when the paddle switch 13 is operated, the light unit 16 is lit simultaneously with the activation of the motor 2.

To assemble a right angle drill 1 thus described, the light unit's grooves 19 are first aligned with the cut-out's ridges 20. The light unit 16 is then inserted into the cut-out 15 from the front until it is set in place in the cut-out. Thereupon, when the gear housing cover 7 and the gear housing 8 are assembled to the tool 1, the light unit 16 is securely mounted with its front end prevented from slipping out forward by the gear housing 8. Upon assembly of the drill 1, when the user depresses the paddle switch 13, the LEDs 21 are lit concurrently with activation of the motor 2, which rotates the output shaft 5. This in turn rotates the spindle 12 via the intermediate shaft 11, causing subsequent rotation of the bit attached to the chuck. As the LEDs 21 are disposed within the protrusion 17 so as to be oriented to provide illumination to objects located below the output spindle 12 (see FIG. 1), the top end of the bit can be sufficiently illuminated to ensure efficient work in otherwise dark environments.

When the field system 3 of the motor 2 needs to be removed for repair or replacement, the gear housing cover 7 and the gear housing 8 are removed from the main housing body 6*a* so as to expose the accommodating hole 18. The field system 3 can then be pulled out of the accommodating hole 18. As the light unit 16 is slidably fitted in the cut-out 15 in a manner that does not interfere with the accommodating hole 18, there is no need to remove the light unit for this operation.

Referring particularly to FIG. 1, when the angle drill 1 is placed on a flat surface with the paddle switch 13 facing downwards, the support structure 14 and the protrusion 17 (which protrude downward substantially the same amount or distance) abut the surface, thus supporting the entire tool in the illustrated horizontal position. As illustrated, due to the predetermined amount of downward protrusion of the two elements, the paddle switch 13 does not protrude below the two-dot chain line L between the lower ends of the support structure 14 and the protrusion 17. This prevents unintended depression of the paddle switch 13 and thus inadvertent activation of the motor 2 and the LEDs 21 when the right angle drill 1 is placed horizontally on a flat surface in the above-described manner.

Figure 5A:
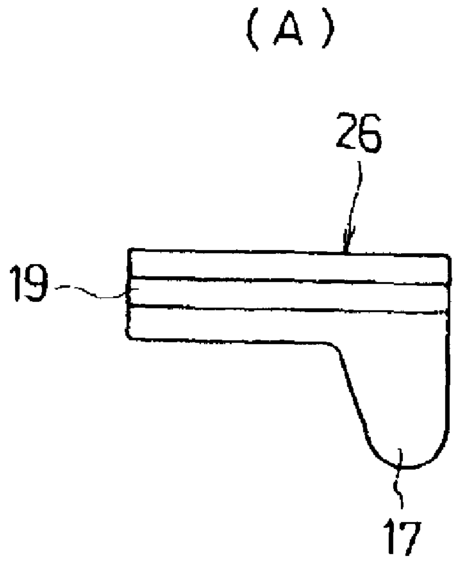
FIG. 5A is a side elevation of a second unit that may replace the light unit.
Figure 5B:
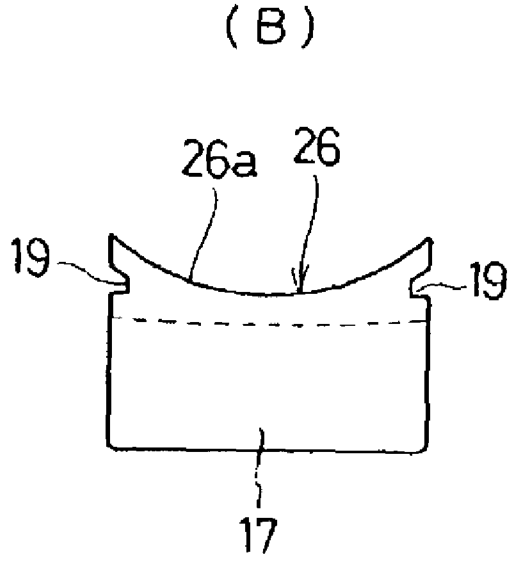
FIG. 5B is a front elevation of the second unit.

As shown in FIG. 5, if there is no need to provide illumination, a second unit 26 may replace the light unit 16. The second unit 26 is identical to the light unit 16, except for the omission of several elements, including the LEDs 21 and the protector portion 24. Additionally, the second unit 26 has an inwardly curved inner surface 26*a* that conforms to the accommodating hole 18. When the second unit is substituted for the light unit 16, inadvertent activation of the paddle switch 13 can also be prevented in the manner described above.

In the angle drill 1 of the foregoing embodiment, the protrusion 17 is provided on the peripheral surface of the main housing body 6*a* such that the protrusion 17 and the protruding end of the output spindle 12 are located on the same side of a plane containing the axis of the motor shaft 5. Furthermore, the protrusion 17 is located axially outside of the hole 18 for accommodating the motor 2, whereas the LEDs 21 are disposed within the protrusion 17. This arrangement does not limit the location in which the field system is mounted within the accommodating hole. This arrangement ensures that the LEDs 21 do not obstruct the removal or installation of the motor 2 for repair or replacement of the motor. The LEDs 21, being disposed within the protrusion 17, can effectively illuminate the location of work by ensuring the user's hand does not block the light path.

As the protrusion 17 extends or reaches axially farther outside than the axially outermost portion of the paddle switch 13, inadvertent activation of the switch 13 is prevented when the right angle drill 1 is placed on a flat surface with the switch face-down.

Moreover, the protrusion 17 is mounted on the light unit 16 in such a manner as to permit removal attachment of the protrusion and the light unit to the main housing body 6*a*. Thus, if no illumination is required, the light unit 16 can be replaced with another element, for example, an identically shaped element without the LEDs and related parts. In this way, a right angle drill without an illuminant can use the same main housing body 6*a* without any redesign of the housing body 6*a*, thus reducing the overall manufacturing costs of the drill.

It should be noted that one or more light bulbs may be used in place of the LEDs. According to the foregoing embodiment, the light unit 16 is removably attached to the main housing body 6*a*. However, an alternate arrangement whereby the light unit is integrated into the main housing body 6*a* will also fall within the scope of the present invention. Furthermore, the support protrusion 14 at the rear end of the main housing body 6*a* may be omitted, if the protrusion 17 alone allows the angle drill to be supported on a flat surface while still preventing unintentional activation of the paddle switch 13. In the foregoing embodiment, the light unit is attached to the main housing body 6*a* by the slidable engagement of the grooves and the ridges from the direction of the top end of the electric tool 1. This arrangement is preferred as it effectively prevents the light unit 16 from slipping out of the housing 6 upon attachment of the gear housing 8, while facilitating removal and attachment of the unit 16 with respect to the main housing body 6*a*. However, the invention may still be practiced by using any other suitable arrangement. For example, the main housing body and the light unit may be provided with one or more recesses and one or more complementary protrusions that are adapted to engage each other from below in order to attach the light unit 16 to the main housing body 6*a*. Alternatively, it is possible to attach the light unit 16 to the housing body 6*a* with one or more screws.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

The invention claimed is:

1. An angle drill comprising:

a motor;

a generally cylindrical motor housing which has a center axis and defines therein a hole for accommodating the motor;

a top housing coupled to a front end of the motor housing;

a spindle extending, at a right angle with respect to the center axis of the motor housing, inside the top housing to one end which protrudes from the top housing;

at least one illuminant disposed on a peripheral surface of the motor housing for illuminating objects generally located in the direction in which the spindle protrudes; and a first protrusion which is disposed at a front end on the peripheral surface of the motor housing and located on the same side of a plane containing the center axis as the protruding end of the spindle, the first protrusion being located outside the motor accommodating hole, wherein the at least one illuminant is disposed within the first protrusion.

2. An angle drill in accordance with claim 1 further comprising a switch for activating the motor by its depression toward the motor housing, the switch protruding from the peripheral surface of the motor housing generally in parallel with the spindle, wherein the first protrusion extends radially farther outwards than does the switch.

3. An angle drill in accordance with claim 1, wherein the first protrusion is adapted so as to be removably attached to the motor housing.

4. An angle drill in accordance with claim 2, wherein the first protrusion is adapted so as to be removably attached to the motor housing.

5. An angle drill in accordance with claim 4, wherein the motor housing includes therein a cut-out including on opposing side surfaces thereof a pair of ridges which are spaced apart from each other by a predetermined distance, the drill further comprising a light unit which includes a plate portion having an inner surface with substantially the same curvature as an inner surface of the accommodating hole, the first protrusion on an outer surface of the plate portion, and a pair of grooves in opposing side surfaces thereof, the grooves being spaced apart by the predetermined distance and complementary in shape to the ridges on the cut-out of the motor housing so as to permit removable attachment of the light unit to the cut-out by slidable engagement of the ridges and the grooves, wherein upon attachment of the light unit to the cut-out, the inner surfaces of the plate portion and the motor housing provide smooth transition therebetween within the motor accommodating hole, with the plate portion not protruding into the motor accommodating hole.

6. An angle drill in accordance with claim 5, wherein the light unit further includes lead wires coupled to the at least one illuminant and a rearward-extending elongated protector portion along which the lead wires are routed so as to maintain separation between the lead wires and the motor.

7. An angle drill in accordance with claim 1, wherein the motor housing further includes a support protrusion which is provided at a rear end thereof and has substantially the same orientation as the first protrusion, the support protrusion protruding substantially the same distance as the first protrusion with respect to the center axis when the switch is not depressed, and further wherein the first protrusion and the support protrusion are configured such that the angle drill is capable of standing on a flat surface supported by the protrusions alone.

8. An angle drill in accordance with claim 1, wherein the at least one illuminant includes at least one light emitting diode (LED).

9. An angle drill in accordance with claim 6 further comprising a second unit having a shape identical to that of the light unit except for the omission of the at least one illuminant, the lead wires, and the protector portion such that the second unit can replace the light unit in the angle drill.

10. An angle drill in accordance with claim 7, wherein the first protrusion, the support protrusion, and the switch are aligned on the peripheral surface of the motor housing in parallel with the center axis of the motor housing.

11. The angle drill of claim 1, further comprising lead wires electrically connecting the illuminant to a drive circuit of the motor, so that the illuminant is lit simultaneously with the activation of the motor.

12. The angle drill of claim 1, wherein the first protrusion further includes a transparent portion below and forward of the illuminant to permit transmission of light emitted by the illuminant.

13. An angle drill comprising:

a motor;

a generally cylindrical motor housing which has a center axis and defines therein an accommodating hole for accommodating the motor and a cut-out opening formed in a bottom surface of the motor housing providing access to the accommodating hole;

a top housing coupled to a front end of the motor housing;

a spindle extending, at a right angle with respect to the center axis of the motor housing, inside the top housing to one end which protrudes from a bottom surface of the top housing; and a light unit configured to be slidably received in the cut-out opening of the motor housing, the light unit including an illuminant for illuminating objects generally located in the direction in which the spindle protrudes.

14. The angle drill of claim 13, wherein the light unit comprises:

a plate portion having an inner surface with substantially the same curvature as an inner surface of the accommodating hole, and a first protrusion on an outer surface of the plate portion, wherein the illuminant is disposed in the first protrusion.

15. The angle drill of claim 14, wherein the cut-out opening includes on opposing side surfaces thereof a pair of ridges which are spaced apart from each other by a predetermined distance, and the light unit includes a pair of grooves in opposing side surfaces of the plate portion, the grooves being spaced apart by the predetermined distance and complementary in shape to the ridges on the cut-out opening of the motor housing so as to permit removable attachment of the light unit to the cut-out opening by slidable engagement of the ridges and the grooves.

16. The angle drill of claim 14, further comprising a switch disposed on the bottom surface for activating the motor by its depression toward the motor housing, the switch protruding from the peripheral surface of the motor housing generally in parallel with the spindle, wherein the first protrusion extends radially farther outwards than does the switch.

17. An angle drill comprising:

a motor;

a generally cylindrical motor housing which has a center axis and defines therein a hole for accommodating the motor;

a spindle protruding from a front end of the angle drill at a right angle with respect to the center axis of the motor housing;

a first protrusion which is disposed on the peripheral surface of the motor housing;

an illuminant disposed within the first protrusion for illuminating objects generally located in the direction in which the spindle protrudes;

a support protrusion formed at a rear end of the motor housing; and a switch for activating the motor by its depression toward the motor housing, the switch protruding from the peripheral surface of the motor housing generally in parallel with the spindle and between the first protrusion and the support protrusion, wherein the spindle, the first protrusion, the switch and the support protrusion are aligned on an underside of the motor housing in parallel with the center axis of the motor housing.

18. The angle drill of claim 17, wherein the first protrusion and the support protrusion extend radially farther outwards than does the switch.

19. The angle drill of claim 17, wherein the first protrusion further includes a transparent portion below and forward of the illuminant to permit transmission of light emitted by the illuminant.

20. The angle drill of claim 17, further comprising lead wires electrically connecting the illuminant to a drive circuit of the motor, so that the illuminant is lit simultaneously with the activation of the motor.

* * * * *